UNITED STATES PATENT OFFICE.

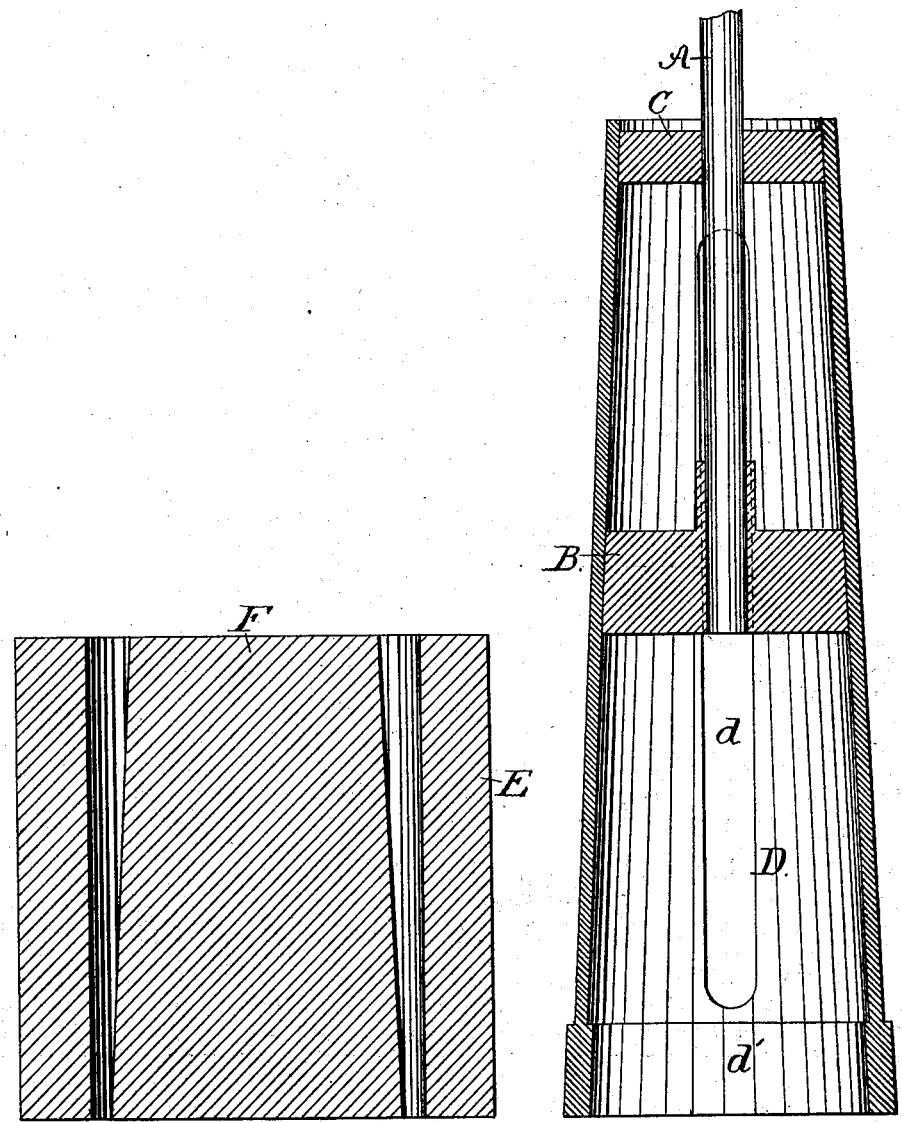

JAMES GAZELEY, OF WATERVLIET, NEW YORK.

CUTTER FOR MACHINES FOR CUTTING CYLINDRICAL FORMS FROM STONE.

SPECIFICATION forming part of Letters Patent No. 248,033, dated October 11, 1881.

Application filed August 22, 1881. (No model.)

*To all whom it may concern:*

Be it known that I, JAMES GAZELEY, of Watervliet, in the county of Albany and State of New York, have invented certain new and useful Improvements in Cutters for Machines for Cutting Cylindrical Cores from Stone, of which the following is a specification.

My invention relates to an improvement on the invention for which Letters Patent No. 239,608 of the United States were granted to me on the 5th day of April, 1881; and the object of this improvement is to provide for the machine described in the said patent a cutter that is adapted to the production of circular cores from stone in a tapering form and in such perfect manner that they may be used for columns and other similar purposes; and this object I attain by means of the device illustrated in the accompanying drawings, which form part of this specification, and in which—

Figure 1 is a vertical section of my coniform cutter as attached to the cutter-head and shaft of the machine described in my above-named patent; and Fig. 2, a vertical section of a block of stone, showing a coniform core cut out but unremoved therefrom.

As represented in the drawings, A is the vertical shaft; B, the cutter-head; and C, the steadiment for the upper end of the cutter, all as described in my Patent No. 239,608, above referred to.

D is a coniform tubular cutter, secured to the cutter-head B and rotated by the shaft A. The tapering form of said cutter is proportioned to suit the required "diminish" of the stone core when completed, and vertical slotted openings *d* are formed in said cutter, for the purpose of facilitating the introduction of suitable abrading material to the inner side of the cutter-tube in such manner that it will be supplied at all points of the inner or convex wearing-surface of the tube to effect the cutting away of the core in a uniform manner to the conic form of the tube.

The lower end of the tubular cutter D may, when preferred, be provided with a re-enforcing portion, *d'*, for increasing the size of the annular incision produced by the lower end of the cutter; but as that feature of my device constitutes the subject for another patent a more particular description of it in this specification is unnecessary.

The operation of this improvement is as follows: The block of stone having been fixed in the machine and the cutter adjusted to its position, as set forth in my prior patent, the machine is set in motion to rotate the cutter, and the abrading material, as described in my aforesaid patent, is fed around the path of the cutter, and by this operation the lower end of the cutter first produces an annular incision in the top of the stone. Then as the cut progresses downward the cutter D will produce a cylindrical bore in the shell of the stone, marked E in Fig. 2; but by reason of the constantly-decreasing diameter of the inner side of the cutter the core F is cut away to conform to the taper of the cutter. By means of the openings *d* the abrading material can be readily fed to the inner side of the cutter, so that the entire surface of that portion of the tube will perform its work in an effective manner and much more perfectly than where the abrading material is fed into the tube at the top of the stone; but while I preferably construct my cutters for conical cores with the openings *d*, my invention embraces such conical cutters when made without said openings.

Instead of an entire conical tubular cutter like the one shown in the drawings, segmental cutters adjusted to the required taper and secured to the cutter-head B may be employed for producing the same result that is obtained by the tubular cutter hereinbefore described.

I claim as my invention—

1. As an improvement in machines for cutting cylindrical cores from stone, the conical tubular cutter D, adapted to produce a coniform core from a block of stone in the manner herein described.

2. A conical cutter, tubular or segmental, for producing coniform cores from stone, and provided with openings through its sides for facilitating the feeding of abrading material to the inner surfaces of said cutter, as and for the purpose herein specified.

JAMES GAZELEY.

Witnesses:
WILLIAM H. LOW,
CHAS. F. SCATTERGOOD.